US012754994B2

United States Patent
(12) United States Patent
Rotenberg et al.

(10) Patent No.: US 12,754,994 B2
(45) Date of Patent: Oct. 6, 2026

(54) AUTOMATIC CREDENTIAL GENERATION FOR AUTHENTICATION PENETRATION TESTING

(71) Applicant: Cisco Technology, Inc., San Jose, CA (US)

(72) Inventors: Reem Rotenberg, Ramat Gan (IL); Aviva Vaknin, Jerusalem (IL); Aviad Rom, Pardes Hanna-Karkur (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 69 days.

(21) Appl. No.: 18/444,905

(22) Filed: Feb. 19, 2024

(65) Prior Publication Data

US 2025/0265329 A1 Aug. 21, 2025

(51) Int. Cl.
*G06F 21/45* (2013.01)

(52) U.S. Cl.
CPC .................................... *G06F 21/45* (2013.01)

(58) Field of Classification Search
CPC ................................ G06F 21/45; G06F 21/55
See application file for complete search history.

(56) References Cited

U.S. PATENT DOCUMENTS 10,423,912 B2 * 9/2019 Garcia ................... G06Q 10/06
2020/0145446 A1 * 5/2020 Deardorff ............... H04L 63/20
2021/0288981 A1 * 9/2021 Numainville ....... H04L 63/1416
2021/0400076 A1 * 12/2021 Shivanna ............... G06N 5/022
2022/0109687 A1 * 4/2022 Sloane .................... H04L 43/04
2022/0147633 A1 * 5/2022 Knox ...................... G06F 21/57
2022/0182397 A1 * 6/2022 Romero Zambrano ..................... H04L 63/1416
2022/0321550 A1 * 10/2022 Ben David .............. G06N 3/04
(Continued)

OTHER PUBLICATIONS

Github, "Crunch Wordlist Generator—Create Single Characters," ~sec/f00tprint, https://secf00tprint.github.io/blog/passwords/crunch/advanced/en, Posted on Feb. 8, 2021, 6 Pages.
(Continued)

*Primary Examiner* — Dao Q Ho
(74) *Attorney, Agent, or Firm* — Edell, Shapiro & Finnan, LLC

(57) ABSTRACT

Provided herein are techniques to automatic credential generation for use in authentication penetration, such as for assets of an enterprise. In one example, a method may include gathering public credentials from a plurality of credential databases; generating, using machine learning logic, one or more sets of the public credentials for each of one or more credential categories, wherein each credential category is associated with at least one credential characteristic. The method may further include gathering enterprise data for an enterprise, the enterprise data including user data for users of enterprise assets; categorizing, using the machine learning logic, the enterprise data into at least one credential category of the one or more credential categories, wherein the at least one credential category is associated with credential generation rules; and generating a plurality of testing credentials based on the enterprise data and the credential generation rules of the at least one credential category.

20 Claims, 6 Drawing Sheets

(56) References Cited

U.S. PATENT DOCUMENTS

2023/0199025 A1* 6/2023 Xu .......................... G06F 21/55
726/22

OTHER PUBLICATIONS

Pentera., "Pentera Platform," https://pentera.io/platform/, Retrieved on Feb. 14, 2024, 4 Pages.

Tenable., "IDC Named Tenable a Leader in Risk-Based Vulnerability Management", Retrieved on Feb. 14, 2024, https://www.tenable.com, 10 Pages.

* cited by examiner

AUTOMATIC CREDENTIAL GENERATION FOR AUTHENTICATION PENETRATION TESTING

TECHNICAL FIELD

The present disclosure relates to network equipment and security.

BACKGROUND

Networking architectures have grown increasingly complex in communications environments. Many communication environments, such as enterprise environments, involve enterprise assets that utilize password authentication mechanisms to facilitate access to such enterprise assets. In order to protect such assets from penetration attacks, many enterprises perform simulated attacks in order to learn about and enhance the security posture of such enterprise assets. Accordingly, opportunities exist to enhance security testing of enterprise assets.

DETAILED DESCRIPTION

Overview

Figure 1:
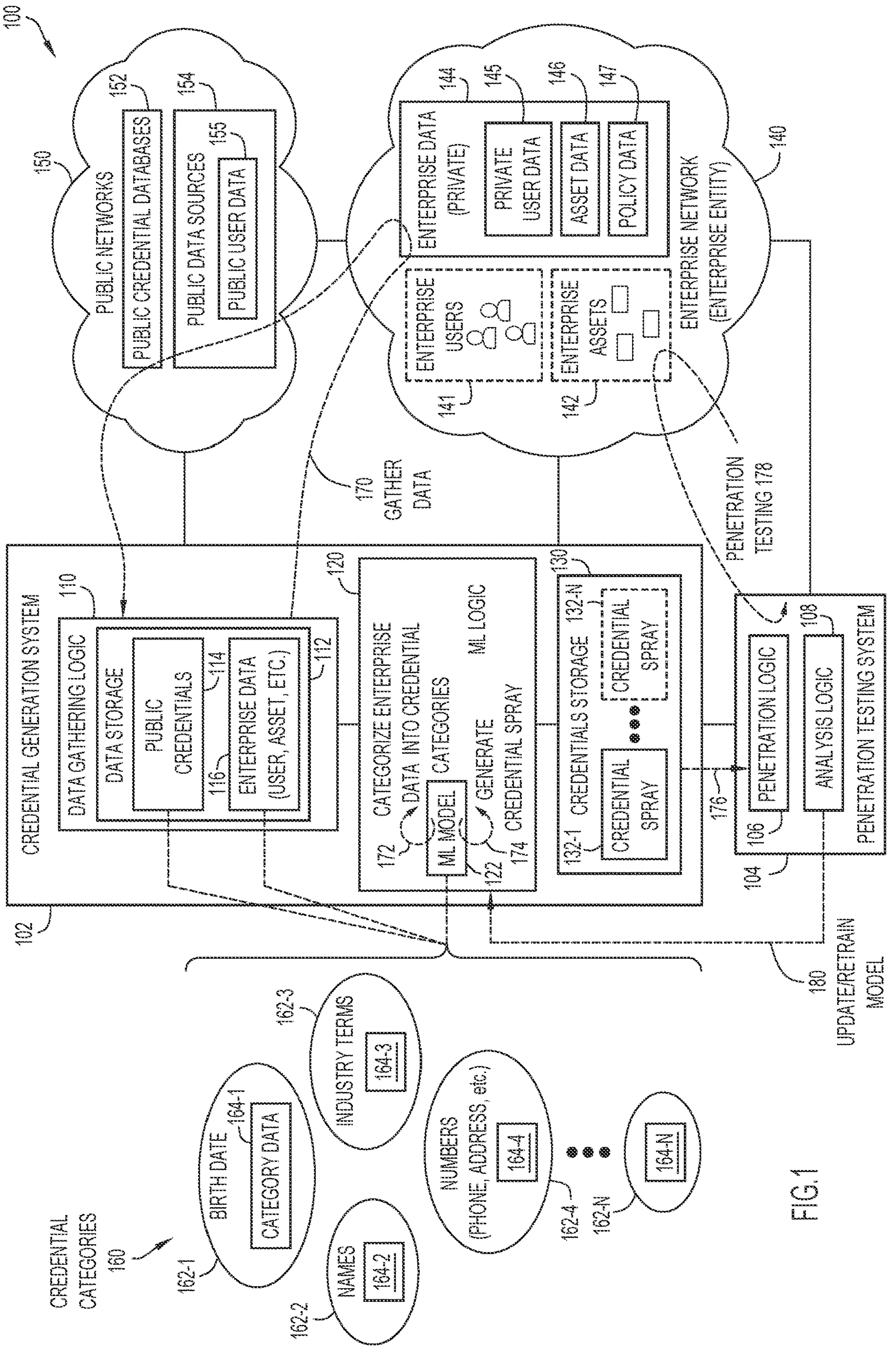
FIG. 1 illustrates a system that may be provided to facilitate automatic credential generation for authentication penetration testing, according to an example embodiment.

Embodiments herein may provide a system through which tailored or customized testing credentials can be generated for an enterprise using machine learning logic that has been trained to categorize enterprise data gathered for an enterprise into one or more credential categories that include category data, such as credential generation rules, that can be used by the machine learning logic to generate the customized testing credentials the using enterprise data gathered for the enterprise, which can include user data for enterprise users of enterprise assets. The testing credentials can be used to perform penetration testing against the enterprise assets.

Example Embodiments

Password authentication is used widely for security in many enterprise systems for both external and internal access to the systems. Generally, passwords can be any combinations of letters, numbers, and/or symbols that serve as authentication methods. Various services, devices, accounts, and systems utilize passwords to verify the identity of users attempting to gain access to such elements.

Password authentication is considered a weak link in many systems as it is often implemented by users who are not typically security aware. Thus, password authentication mechanisms are often the first point of attack for an attacker.

Companies or enterprises attempt to protect themselves from authentication penetration attacks using different security measures. One such security measure that an enterprise entity may perform is to attempt to attempt to penetrate their own systems to further enhance their security posture. Penetration attempts or testing of enterprise assets (e.g., devices, systems, accounts, etc.) typically involve the use of many potential passwords often referred to as a "password spray" or, more generally, as a "credential spray."

Conventional password/credential generation techniques are typically not evolved and often do not utilize algorithms to generate credentials in a methodological manner, which reduces the effectiveness of the penetration attempts and ability for companies to protect themselves.

Regarding penetration testing, current penetration testing tools can be divided into manual and automatic tools. Manual password penetration testing tools and automatic password penetration testing tools serve distinct purposes in evaluating the security of an organization's digital assets. Manual tools, often employed by skilled ethical hackers or penetration testers, involve human intervention and expertise to assess password security. Such manual tools often involve meticulous examination of password policies, user behavior, and potential vulnerabilities. Testers may employ techniques such as password guessing, dictionary attacks, or brute force attacks to uncover weak or easily guessable passwords. Manual testing offers the advantage of tailored and contextual assessments, enabling testers to consider nuances specific to an organization's environment.

In contrast, automatic password penetration testing tools automate the assessment process to a significant extent. These tools typically rely on predefined algorithms and attack methodologies to rapidly identify weak passwords across a network or application. Automatic tools excel in scalability and efficiency, as they can scan large volumes of passwords and user accounts swiftly. They are especially valuable for conducting routine security audits and identifying common password-related vulnerabilities. However, their scope is often limited to predefined attack vectors that may not capture contextual nuances or sophisticated attack scenarios as effectively as manual testing.

It would be advantageous to provide a solution that combines both manual and automatic password penetration testing tools into a unified solution that offers a compelling advantage in assessing password security comprehensively. By integrating human expertise with automated scanning capabilities, such a solution ensures that an enterprise entity's nuances and unique password policies can be considered during security assessments. This synergy allows for a more refined and tailored evaluation of password security, as it considers factors like password complexity requirements, user behavior patterns, and specific contextual details. Manual testing can uncover subtle vulnerabilities that might go unnoticed by purely automated tools, such as identifying weak passwords based on organizational culture or industry-specific terms. Additionally, automatic testing can efficiently cover a wide range of accounts, reducing the burden on security teams and enabling frequent assessments to stay ahead of evolving threats. In essence, this combined approach not only identifies common weaknesses but also delves deeper into the subtleties of an organization's password security landscape, providing a more robust defense against potential threats.

Embodiments herein provide for the ability to generate, using machine learning logic, testing credentials for use in simulated authentication or penetration attacks, referred to herein as "penetration testing," of enterprise assets in an automated and directed manner. Such smart credential generation provided by machine learning logic may enable successful credential attacks against enterprise assets that can be used to efficiently improve the security posture of an enterprise entity/enterprise assets; thereby enabling an enterprise entity to attempt to penetrate their own assets and thus gain knowledge to better protect their assets.

Referring to FIG. 1, FIG. 1 illustrates a system 100 that may be provided to facilitate automatic credential generation for authentication penetration testing, according to an example embodiment. In at least one embodiment, system 100 may be provided to facilitate automatic credential generation for use in authentication penetration of enterprise assets 142 belonging to an enterprise network 140 operated by an enterprise entity (e.g., a business, an organization, an institution, etc.), more generally referred to herein as an "enterprise."

In at least one embodiment, system 100 may include a credential generation system 102 that interfaces with a penetration testing system 104. Also shown in system 100 are an enterprise network 140 and public networks 150. Credential generation system 102 and penetration testing system 104 may further interface with enterprise network 140, which may also interface with public networks 150 in any manner. Credential generation system 102 may also interface with public networks in any manner.

In at least one embodiment, credential generation system 102 may include data gathering logic 110, machine learning (ML) logic 120, and credentials storage 130. In at least one embodiment, data gathering logic 110 may include data storage 112 that can be used to store public credentials 114 and enterprise data 116 (e.g., user data for enterprise users, asset data for enterprise assets, enterprise password policies, etc., as discussed herein).

In at least one embodiment, ML logic 120 may include a ML model 122 that can be trained and used to generate customized credentials, referred to herein as credential spray (s), for use in penetration testing of enterprise assets 142. In at least one embodiment, credentials storage 130 can be used to store one or more generated credential sprays 132-1 thru 132-N that can be used in penetration testing in accordance with embodiments herein. In at least one embodiment, penetration testing system 104 can include penetration logic 106 and analysis logic 108.

In various embodiments, ML logic 120/ML model 122 can be trained and operated as any combination of unsupervised clustering models (e.g., K-means, etc.), recurrent neural network (RNN) models, Transformer-based decoder models, Neural recommender models, and/or any other artificial intelligence (AI)/ML models now known in the art or hereinafter developed in order to perform any operations as discussed for embodiments herein (e.g., generating credential categories and category data, categorizing enterprise data into credential categories, generating credential spray (s), etc.).

In at least one embodiment, enterprise network 140 may include enterprise assets 142, which may include, but not be limited to, systems, services, hardware elements (e.g., servers, storage devices, etc.), combinations thereof and/or any other appropriate assets that may utilize password authentication mechanisms for accessing such enterprise assets 142 by enterprise users, such as enterprise users 141, as illustrated for enterprise network 140. Enterprise network may further include private data sources 144, which may include any combination of private user data 145 (of enterprise users 141), asset data 146 (of enterprise assets 142), and/or policy data 147 (e.g., enterprise password policies, such as password length, required use of special characters (or not) or subsets of special characters, required use of numbers and letters, required use of capital and lower case letters, etc.).

In at least one embodiment, public networks 150 may include public credential databases 152, such as Open-Source Intelligence (OSINT) databases containing publicly available credentials (e.g., public credentials 114), and public data sources 154, which may include, but not be limited to, social media services, data storage repositories, and/or any other service, function, system, and/or the like that may maintain information publicly available information of enterprise users 141, shown in FIG. 1 as public user data 155. In at least one embodiment, public user data 155 may include data associated with the enterprise entity of enterprise network 140 (e.g., corporate data, board member data, etc.).

Broadly during operation of system 100, embodiments herein provide for the intelligent generation of customized testing credentials, such as credential spray 132-1, by ML logic 120 (via ML model 122) based on public credentials 114 and enterprise data 116 gathered by credential generation system 102 in which the testing credentials can be used to attempt to penetrate enterprise assets 142 via penetration testing operations 178, as shown in FIG. 1.

Consider an operational example through which embodiments of system 100 may be described. For the present example, consider that an example enterprise user 141, Jane Doe, is employed by the enterprise entity and has been granted access to a given enterprise asset 142 of enterprise network 140 such that the enterprise entity seeks to test the security worthiness of Jane's passwords.

As shown at 170, credential generation system 102, via data gathering logic 110, can perform data gathering operations, as shown at 170, from public and private data sources. The data gathering operations 170 performed by credential generation system 102 can include gathering enterprise data 116, which may include any combination of public user data 155 from public data sources 154 and/or private user data 145, asset data 146, and/or policy data 146 from private data sources 144. In various embodiments, data gathering operations 170 can include any combination of query/response communications/exchanges with any combination of public and/or private data sources via one or more network communications, receiving/obtaining periodic updates from any combination of public and/or private data sources via one or more network communications, using any push/pull and/or subscribe/publish communications/exchanges via one or more network communications, scanning data sources, and/or any other network communications as may be understood by a person of ordinary skill in the art.

For the present example, the enterprise data 116 gathered for Jane may include Jane's full name, date of birth, hobbies, technical interests/background, hometown, etc., as well as any various enterprise-specific information regarding Jane, such as Jane's employment grade/level, asset information regarding the asset to which Jane has been given access, programming languages and/or other technical information associated with the assets/Jane's employment and/or any other combination of data that may be publicly and/or privately made available for Jane. Consider for the present example that Jane's name 'Jane Doe', Jane's date of birth, 'Apr. 2, 1982' (Apr. 2, 1982), (e.g., publicly gathered data), and an network security project named, 'Titan 1', on which Jane is currently working for the enterprise entity using the enterprise asset (e.g., privately gathered data), are various data (e.g., enterprise data 116) gathered by credential generation system 102 via the data gathering operations 170. Details associated with the network security project (e.g., security protocols, project scope, etc.) may be included in the data gathered for the enterprise user 141 (Jane).

Thus, the data gathering operations 170 can be used gain knowledge about client assets/information that may be relevant to any combination of external and internal attacks. For example, for attacks that originate outside of enterprise network 140, it would be useful to gather personal data of individuals who have accounts for enterprise assets 142, such as owners, board-members, employees, etc. (e.g., enterprise users 141). This and other data can be obtained by Open-Source Intelligence (OSINT) methods. In another example, for attacks that may originate from within enterprise network 140, for instance, if an attempt is made to gain access to a database from within a Kubernetes pod, it would be useful to gather internally exposed or private data obtained from within enterprise network, such as such as running services, data extracted from the enterprise network, policy information, asset information, etc.

The data gathering operations 170 performed by credential generation system 102 can also include gathering public credentials 114 from public credential databases 152. In accordance with embodiments herein, ML logic 120 including ML model 122 can been trained to identify and create clusters or categories of credentials, such as categories of the different sets of public credentials 114 gathered from the public credential databases 152, shown in FIG. 1 as credential categories 160, including various categories 162-1 thru 162-N, in which the different categories can be determined by ML logic 120 (via ML model 222) based on similar credential characteristics or other hyperparameters that are identified by the ML logic 120 among the gathered public credentials 114.

Each cluster/category of credentials 162-1-162-N can include a potential set of the public credentials that are similar based on at least one characteristic and hyperparameters, and other associated category data 164-1-164-N as identified by the ML logic 120, such as credentials having birth date characteristics (a birth date credential category 162-1, as shown in FIG. 1), credentials containing user/personal name characteristics (a names credential category 162-2, as shown in FIG. 1), credentials containing characteristics of industry/technical specific terms (an industry terms credential category 162-3, as shown in FIG. 1), credentials containing numerical information characteristics, such as phone numbers, addresses, etc. (a numbers credential category 162-4, as shown in FIG. 1), and/or any other credential categories 162-N (e.g., credentials containing sports characteristics, credentials containing school/university characteristics, etc.).

Category data 164-1-164-N for each corresponding credential category 162-1-162-N for each corresponding credential category (e.g., category data 164-1 for the birth date credential category 162-1, category data 164-2 for the names credential category 162-2, category data 164-3 for the industry terms credential category 162-3, category data 164-4 for the numbers category data 164-4, etc.) can include terms and/or credential characteristics used to identify characteristics of the set of public credentials belonging to the category. For example, terms, such as first name, last name, middle name, surname, nickname, etc. can be characteristics of credentials belonging to the names credential category 162-1. In another example, different industry specific terms such as programming languages, technology types, technology acronyms, etc. can be characteristics of credentials (credential characteristics) belonging to the industry terms credential category 162-3. Accordingly, any terms, characteristics, and/or other hyperparameters can be identified for different credential categories.

Category data 164-1-164-N for each corresponding credential category 162-1-162-N can also include credential generation rules learned by the ML logic 120/ML model 122 based on the public credentials 114 identified for a particular category, such as formatting, organization, permutations, etc. of different credentials included in each category in which the credential generation rules can be used to generate custom credentials using the enterprise data 116, and/or any other data that may be utilized by ML logic 120/ML model 122 to generate custom credentials using the enterprise data 116 for one or more categories into which the enterprise data 116 are categorized by the ML logic 120/ML model 122 during operation of credential generation The credential categories 162-1-162-N of the sets of public credentials 114 and their associated category data 164-1-164-N can serve as a data store for learning and generating different credential sprays utilizing ML model 122 based on the enterprise data 116 gathered for the enterprise entity. In some instances, the ML model 122 can be trained to learn and generate multi-category data that is representative of category data across multiple different credential categories in which the multi-category data may include credential generation rules learned by the ML logic 120/ML model 122 for credentials that include characteristics from multiple credential categories (e.g., names+birth date+industry terms or the like).

During operation, client specific data, such as enterprise data 116 gathered via data gathering operations 170 can be fed into the ML logic 120/ML model 122 in order to categorize the enterprise data 116 into at least one credential category of the credential categories 160 as identified for the public credentials 114, as generally shown at 172 of FIG. 1 (referred to herein as categorization operations 172).

For example, through the data categorization operations 172 the enterprise data 116 can be fed into or otherwise consumed by the ML logic 120 in order to identify or categorize via the ML model 122 the enterprise data 116 into one or more relevant credential categories (and corresponding category data) that can be used by the ML logic 120/ML model 122 to algorithmically generate at least one credential spray (e.g., credential spray 132-1) as generally shown at 174, that includes testing credentials that have been customized using the gathered enterprise data 116 for use penetration testing of the enterprise assets 142.

In at least one embodiment, the categorizing operations performed by the ML logic 120/ML model 122 on the enterprise data 116 can include determining characteristics of the enterprise data 116 or identifying certain terms included in the enterprise data 116 and matching the characteristics or terms of the enterprise data to at least one credential characteristic or term associated with one or more credential category, as can be identified via the category data of the at least one credential category.

The generated credential spray, such as credential spray 132-1, can then be provided to the penetration testing system 104, as generally shown at 176, and used through penetration testing operations 178 to attempt to penetrate a target system, such as to penetrate at least one of the enterprise assets 142.

Consider, the example in which Jane Doe's, name 'Jane Doe', date of birth, 'Apr. 2, 1982' (Apr. 2, 1982), (e.g., publicly gathered data), and the network security project named, 'Titan 1', on which Jane is currently working for the enterprise entity using the enterprise asset (e.g., privately gathered data), are gathered by credential generation system 102 via the data gathering operations 170. In this example, the data gathered for the enterprise user 141 (Jane) can, through categorization operations 172 performed by the ML logic 120/ML model 122 can categorize the data into the names credential category 162-2, the birth date credential category 162-1, and potentially the industry terms credential category 162-3.

For the present example, assume that the industry terms credential category 162-3 has been trained/learned by the ML logic 120/ML model 122 to recognize or identify different credential characteristics, terms, etc. associated with different network security information (e.g., protocols, terms of art, programming languages, programming syntaxes, etc.) and has been trained/learned various credential generation rules that can be used to generate potential testing credentials for the credential category in which the network security information and credential generation rules can be included in the category data 164-3 for the industry terms credential category 162-3

Upon categorizing the data for Jane into the different credential categories, the ML logic 120/ML model 122 can algorithmically generate a credential spray, as generally illustrated at 174, including a plurality of testing credentials that are generated from the enterprise data gathered for the enterprise user based on the credential categories into which the enterprise data is categorized and the credential generation rules of the associated credential categories. In at least one embodiment, the generation of the credential spray by the ML logic 120/ML model 122 can be further based on policy data 147 included in the enterprise data, for example, such as minimum or maximum password length, required use of special characters (or not) or subsets of special characters, required use of numbers and letters, required use of capital and lower case letters, and or the like For the present example, different testing credentials generated based on Jane's gathered may include 'Acl:doeja82' (e.g., as a combination of an industry specific 'access control list' or 'ACL' term that is learned by the ML logic 120/ML model 122 as a commonly used network security term and use syntax, along with commonly used name and birth date credential formatting as learned by ML logic 120/ML model 122), 'janeDoe0482' (e.g., as a combination of the project name, Jane's name, and birth date information that is formatted in a commonly used manner as learned by the ML logic 120/ML model 122 for the various credential categories, 'Titan82acl(Doe)' (e.g., for another format of commonly used credentials for the different identified categories), and/or any other conceivable customized testing credential that as may be generated by ML logic 120/ML model 122 based on the categories into which the enterprise data 116 for Jane have been identified.

In at least one embodiment, credentials generated by credential generation system 102 for a credential spray, such as credential spray 132-1, can include a plurality of testing passwords (sometimes referred to as a 'wordlist') that can be provided to the penetration testing system, as shown at 176, and used via the penetration testing system 104 to attempt to penetrate enterprise assets 142 via penetration testing operations 178. In at least one embodiment, credentials generated by credential generation system 102 for a credential spray, such as credential spray 132-1, can include a plurality of testing passwords and testing usernames that can be used to attempt to penetrate enterprise assets 142 via penetration testing operations 178.

Penetration testing operations, such as illustrated at 178, may be performed using any techniques now known or hereinafter developed as may be understood by a person having ordinary skill in the art in which different testing credentials of a credential spray, such as credential spray 132-1, generated by the credential generation system can be used by the penetration testing system 104, via penetration logic 106, to attempt to login to one or more of enterprise assets 142 using the testing credentials. Results of the penetration testing operations 178, such as hits or misses for each of the testing credentials, anomalous behavior such as potential but not full access grants, and/or the like can be recorded and/or analyzed by analysis logic 108 and/or by a human operator to improve the ML model 122 through updating and/or retraining the model, as generally shown at 180.

For example, it may be advantageous to enrich the ML model 122 regarding the category data 164-1-164-N for each credential category 162-1-162-N or, potentially new categories, through continued data gathering of public credentials 114 and/or updating/retraining of the ML model 122, as generally illustrated at 180, based on results of penetration testing operations 178 (and potentially user input), such that new terms and characteristics of different and/or new credential categories can be learned by the ML model 122 as using a broad set of terms within each category may help to broaden the reach of the credential generation system 102 in a targeted manner to generate new credential sprays.

Accordingly, embodiments herein may provide for company teams to attempt to penetrate their own systems and thus gain knowledge to better protect their systems. Through embodiments herein, a system may be provided to collect comprehensive information about an enterprise (e.g., assets, users, etc.) in order to generate customized and tailored credentials using AI/ML techniques for use in simulated authentication attacks in an automated and directed manner to ensure high hit rates for penetration testing of enterprise assets.

Figure 2:
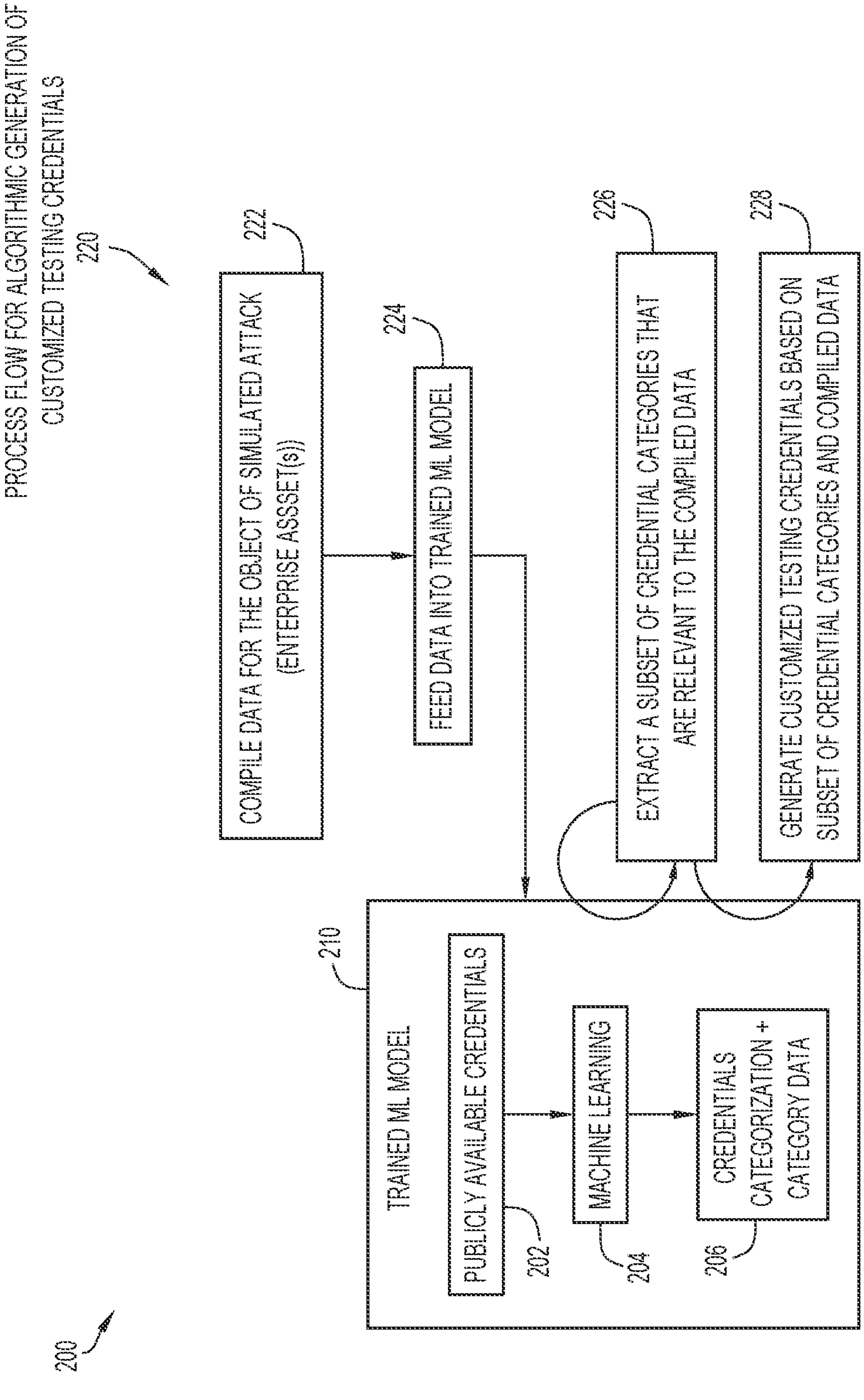
FIG. 2 is a diagram illustrating an operational processing flow that may be utilized to facilitate automatic credential generation for authentication penetration testing, according to an example embodiment.

Referring to FIG. 2, FIG. 2 is a diagram illustrating an operational processing flow 200 that may be utilized to facilitate automatic credential generation for authentication penetration testing using, for example system 100 as shown in FIG. 1, according to an example embodiment.

As generally illustrated at 210, an ML model, such as ML model 122 of FIG. 1, can be trained to learn/identify different credential categories (e.g., credential categories 160, as shown in FIG. 1). For the ML model training, publicly available credentials (e.g., public credentials 114, as shown in FIG. 1) can be gathered/obtained, as generally shown at 202, using any OSINT methods in order to gather/obtain such credentials from different public credential databases (e.g., public credential databases 152, as shown in FIG. 1). Thereafter, machine learning operations (as generally illustrated at 204) can be performed on the public credentials in order to learn similarities or characteristics among the credentials (e.g., credential characteristics) such that different credentials can be clustered into different credential categories and category data (e.g., that identifies the credential characteristics, common terms, and credential generation rules) for each credential category can be populated and stored for the trained ML model (as generally illustrated at 206).

Thereafter, a process flow 220 for the algorithmic generation of customized testing credentials for an enterprise can be utilized (via system 100) in accordance with embodiments herein. For example, as shown at 222, the process flow 220 may include compiling data for the object of a simulated attack (e.g., enterprise data 116, such as any combination of public and potentially private enterprise user data, enterprise asset data, enterprise policy data, etc. that may be gathered for penetration testing to be performed for enterprise assets 142 of enterprise network 140). The gathered data can be fed into or otherwise consumed by the trained ML model, as generally shown at 224.

The trained ML model can then extract a subset of credential categories (and associated category data) that are relevant to the compiled data, as generally shown at 226, in which the subset of credential categories/category data may be considered a first model output of the ML model that may serve as 'seeds' for generating customized testing credentials using the compiled data, as generally shown at 228, in which the customized testing credentials may be considered a second model output of the ML model.

In at least one embodiment, extracting the subset of credential categories that are relevant to the compiled data may include determining characteristics of the compiled data or identifying certain terms included in the compiled data and matching the characteristics or terms of the compiled data to at least one credential characteristic or term associated with one or more credential category, as can be identified in the category data of the at least one credential category.

Figure 3:
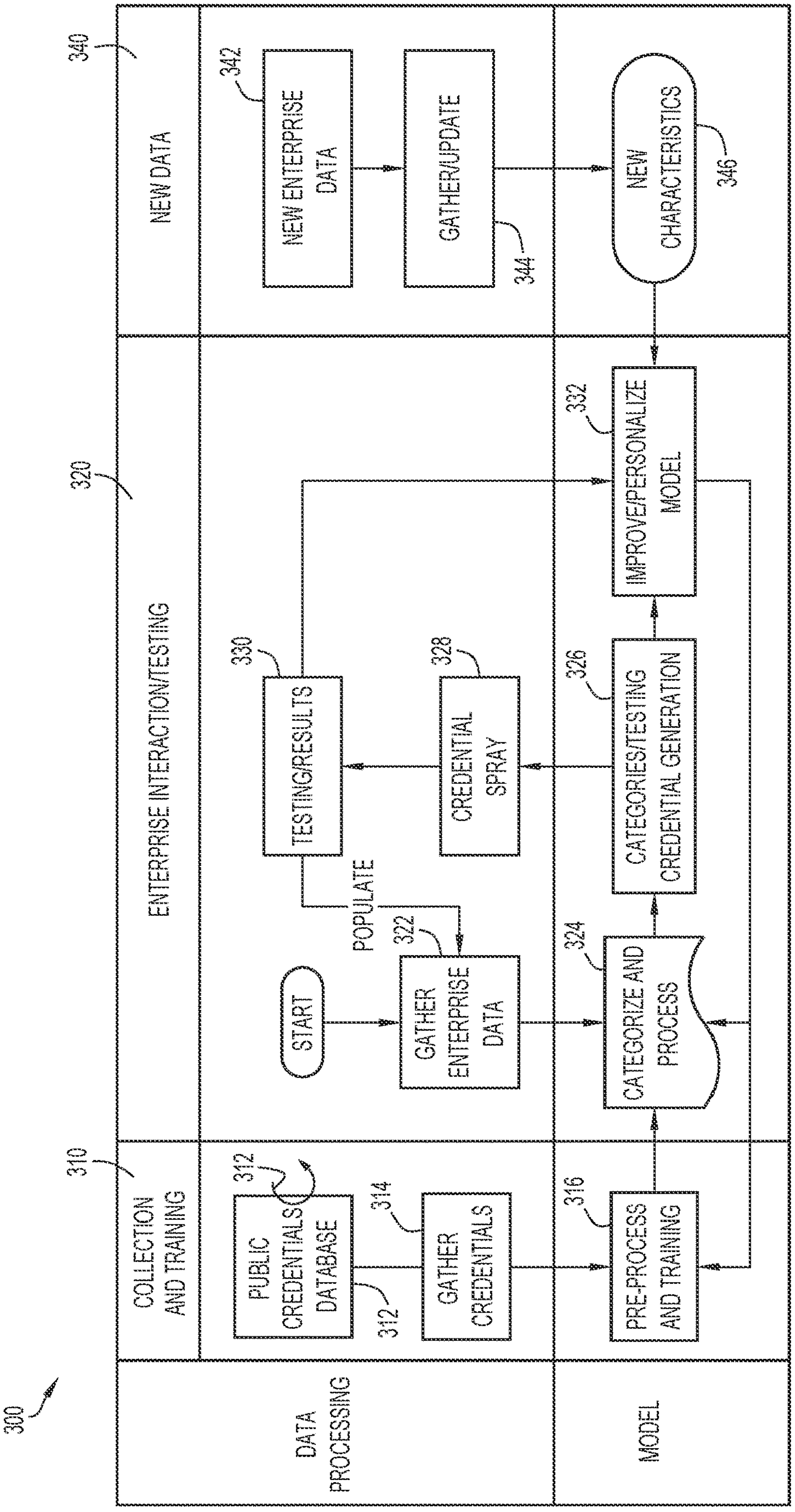
FIG. 3 is a diagram illustrating an example processing architecture that may be utilized to facilitate a training and using a credential generation machine learning model via a credential generation system to facilitate automatic credential generation, according to an example embodiment.

Consider additional example details that may be associated with an ML model that can be trained to categorize credentials and gathered data into credential categories and category data that can be used to generate customized testing credentials in accordance with embodiments herein. For example, referring to FIG. 3, FIG. 3 is a diagram illustrating an example operational processing architecture 300 that may be utilized to facilitate a training and using a credential generation machine learning (ML) model via a credential generation system (e.g., credential generation system 102, as shown in FIG. 1) to facilitate automatic credential generation for an enterprise, according to an example embodiment.

The processing architecture 300 may include various operational phases or stages, such as a collection and training processing stage 310, an enterprise interaction and testing processing stage 320, and a new data processing stage 340. Although separate processing stages 310, 320, and 340 are illustrated for the processing architecture 300, it is to be understood that various processing operations of the various stages may overlap in any manner.

Consider various example processing operations that may be performed through the collection and training processing stage 310. For example, various public credential databases may be updated (external to the credential generation system operations), as generally shown at 312, in which the public credential databases may be monitored (e.g., via data gathering logic 110) and/or otherwise queried to gather publicly available credentials by the system, as generally shown at 314. The public credentials can be used through pre-processing and training operations in order to train the ML model, as generally shown at 316, to identify similarities or characteristics of the credentials and create clusters or categories for the credentials and also to learn and generate category data for the different credential categories and/or potentially multi-category data in which the category data/multi-category data may include may include/identify any combination of credential characteristics, terms, and credential generation rules that can be used to later categorize gathered enterprise data and create customized credentials using the category data and the gathered enterprise data through the enterprise interaction and testing processing stage 320, now discussed.

For example, in the enterprise interaction and testing processing stage 320, the credential generation system can gather enterprise data, as generally shown at 322, from any combination of public and/or private data sources for enterprise users that may be associated with different enterprise assets for which penetration testing is desired by the enterprise. The enterprise data can be fed to or otherwise consumed by the trained ML Model, as shown at 324, which can generate various model outputs, as shown at 326, in which the model outputs may include categorizing the enterprise data into at least one of the credential category (having associated category data/credential generation rules) and generating testing credentials based on the gathered enterprise data and the credential generation rules of the at least one credential category.

In at least one embodiment, the categorizing operations performed on the enterprise data by the ML logic can include determining characteristics of the enterprise data or identifying certain terms included in the enterprise data and matching the characteristics or terms of the enterprise data to at least one credential characteristic or term associated with one or more credential category, as can be identified in the category data of the at least one credential category.

The generated testing credentials may be packaged into or otherwise form a credential spray, as generally shown at 328, that can be used to perform penetration testing on the enterprise assets, as generally shown at 330.

The enterprise interaction and testing processing stage 320, potentially in combination with the new data processing stage 340, can additionally provide for enriching the ML Model through various operations. For example, the penetration testing and results (330) can provide additional enterprise data in some instances, that can be fed back into the ML model to improve the accuracy of the testing credentials. In another instance, penetration and testing results can be analyzed and used, as generally shown at 332, to improve or otherwise personalize/update the ML model for the enterprise penetration testing, such that the ML model can be re-trained using the updated (e.g., via training operations 316).

In another instance, as generally shown at 342, new enterprise data can be generated by the enterprise such that the credential generation system can gather the new/updated data, as generally shown at 344. The new enterprise data may represent new characteristics or other hyperparameters, as generally shown at 346, that can be used to personalize/improve the model, potentially through re-training the model and/or through feeding the new data/characteristics into the trained model to generate new testing credentials for the enterprise.

Figure 4:
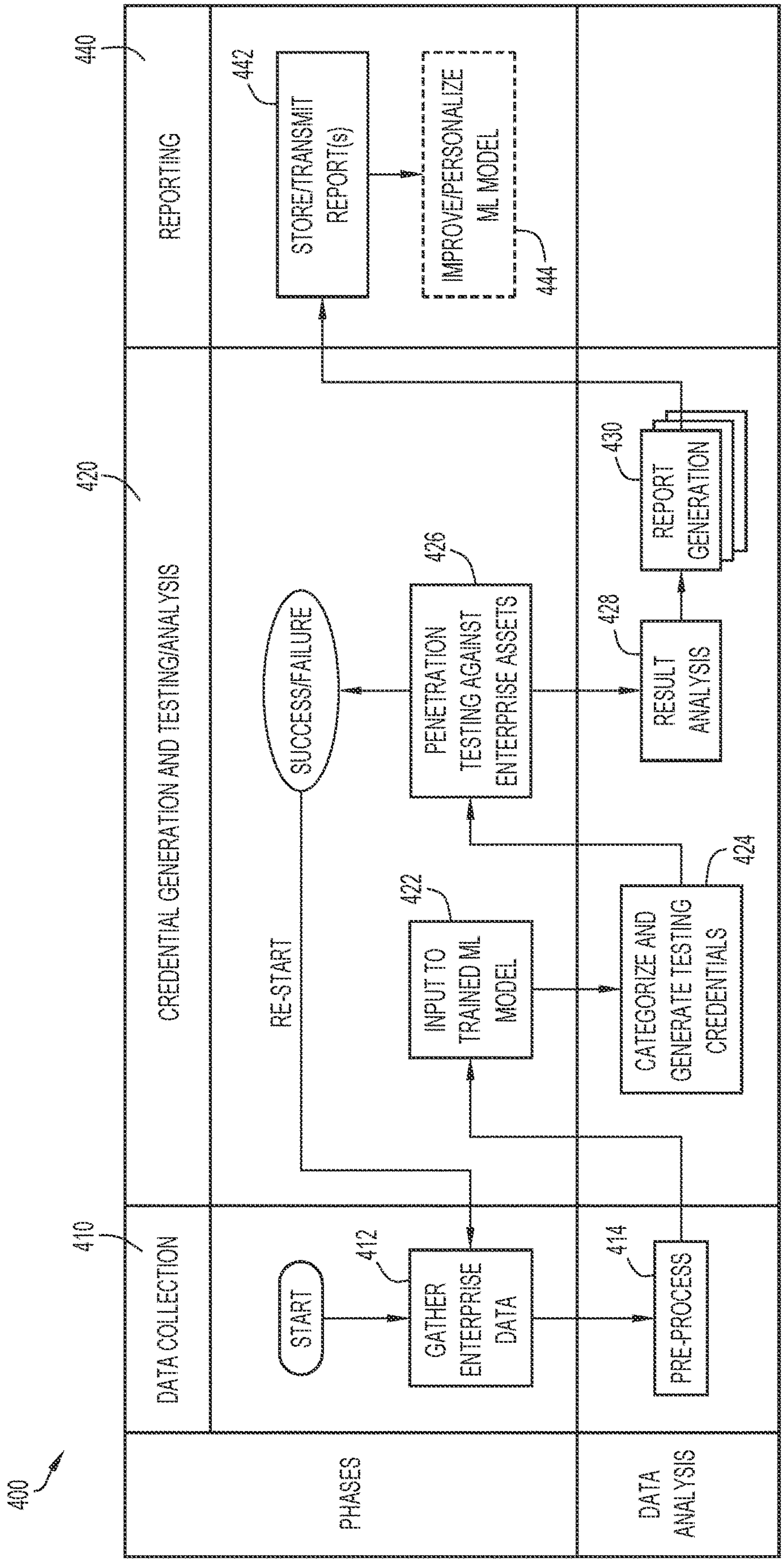
FIG. 4 is a diagram illustrating example processing architecture that may be utilized to facilitate automatic testing credential generation and penetration testing operations for an enterprise, according to an example embodiment.

Turning to FIG. 4, consider additional example details that may be associated with various automatic testing credential generation and penetration testing operations that may be performed for an enterprise, according to an example embodiment. For example, FIG. 4 is a diagram illustrating an example operational processing architecture 400 that may be utilized to facilitate automatic testing credential generation and penetration testing operations for an enterprise utilizing a credential generation system and a penetration testing system (e.g., credential generation system 102 and penetration testing system 104), according to an example embodiment.

The processing architecture 400 may include various operational phases or stages, such as a data collection stage 410, a credential generation and testing/analysis stage 420, and a reporting stage 440.

Consider various example processing operations that may be performed through the data collection stage in which, as generally shown at 412, enterprise data can be gathered from various public and private data sources. In at least one embodiment, the enterprise data can be pre-processed, as shown at 414, which may include enriching the data, removing certain data, and/or formatting the data to be fed into a trained ML model, such as ML model 122 operated via ML logic 120 as discussed for embodiments herein.

For the credential generation and testing/analysis stage 420, the enterprise data can be fed into the trained ML model, as generally shown at 422, which may operate to categorize the enterprise data into one or more credential categories and generate testing credentials, as generally shown at 424, in accordance with embodiments herein. The generated testing credentials can then be used (e.g., via penetration testing system 104) to perform penetration testing against enterprise assets, as generally shown at 426. Results of the penetration testing can be analyzed, as generally shown at 428 (e.g., to determine hits/misses, to analyze various testing aspects, etc.) and one or more testing reports can be generated, as generally shown at 430. Through the reporting stage, the testing reports may be stored and/or reported (e.g., to a testing supervisor, to a network administrator, etc.), as generally shown at 442. In at least one embodiment, the stored/reported testing reports can be used to improve and/or personalize the ML Model, as generally shown at 444. Additionally, the process can be re-started by gathering additional enterprise data again at 412 and continue therefrom.

Figure 5:
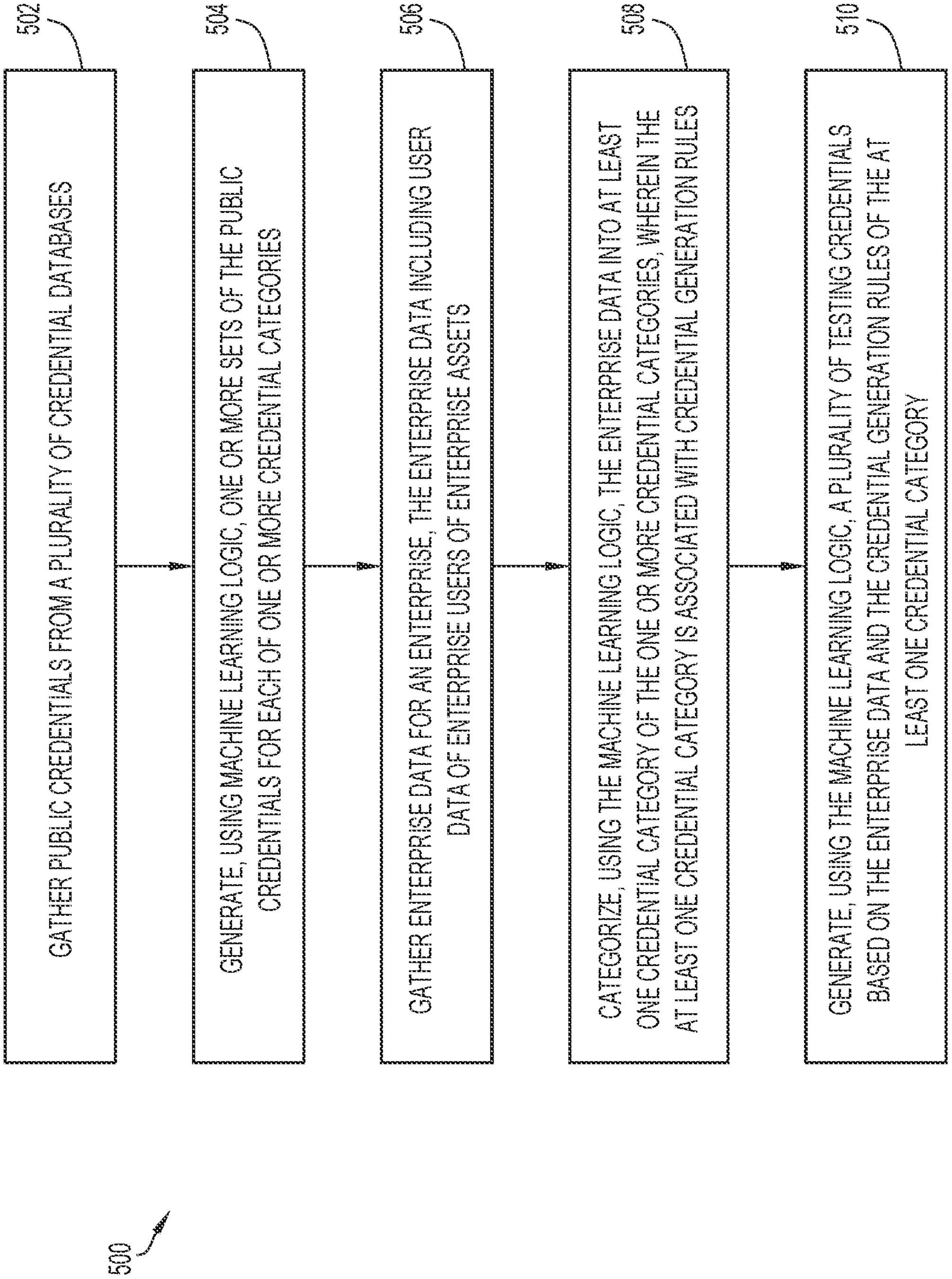
FIG. 5 is a flow chart depicting a method according to an example embodiment.

Referring to FIG. 5, FIG. 5 is a flow chart depicting a method 500, according to an example embodiment. In at least one embodiment, method 500 illustrates operations that may be performed by a credential generation system, such as credential generation system 102, in order to facilitate the automatic generation of testing credentials that can be used to perform penetration testing against one or more enterprise assets, according to an example embodiment.

At 502, the method may include gathering public credentials from a plurality of credential databases. As shown at 504, the method may include generating, using machine learning logic, one or more sets of the public credentials for each of one or more credential categories.

As shown at 506, the method may include gathering enterprise data for an enterprise, the enterprise data including user data of enterprise users of enterprise assets. As shown at 508, the method may include categorizing, using the machine learning logic, the enterprise data into at least one credential category of the one or more credential categories, wherein the at least one credential category is associated with credential generation rules. Further, as shown at 510, the method may include generating, using the machine learning logic, a plurality of testing credentials based on the enterprise data and the credential generation rules of the at least one credential category. Although not shown in FIG. 5, the method may further include performing penetration testing of the enterprise assets using the plurality of testing credentials.

Figure 6:
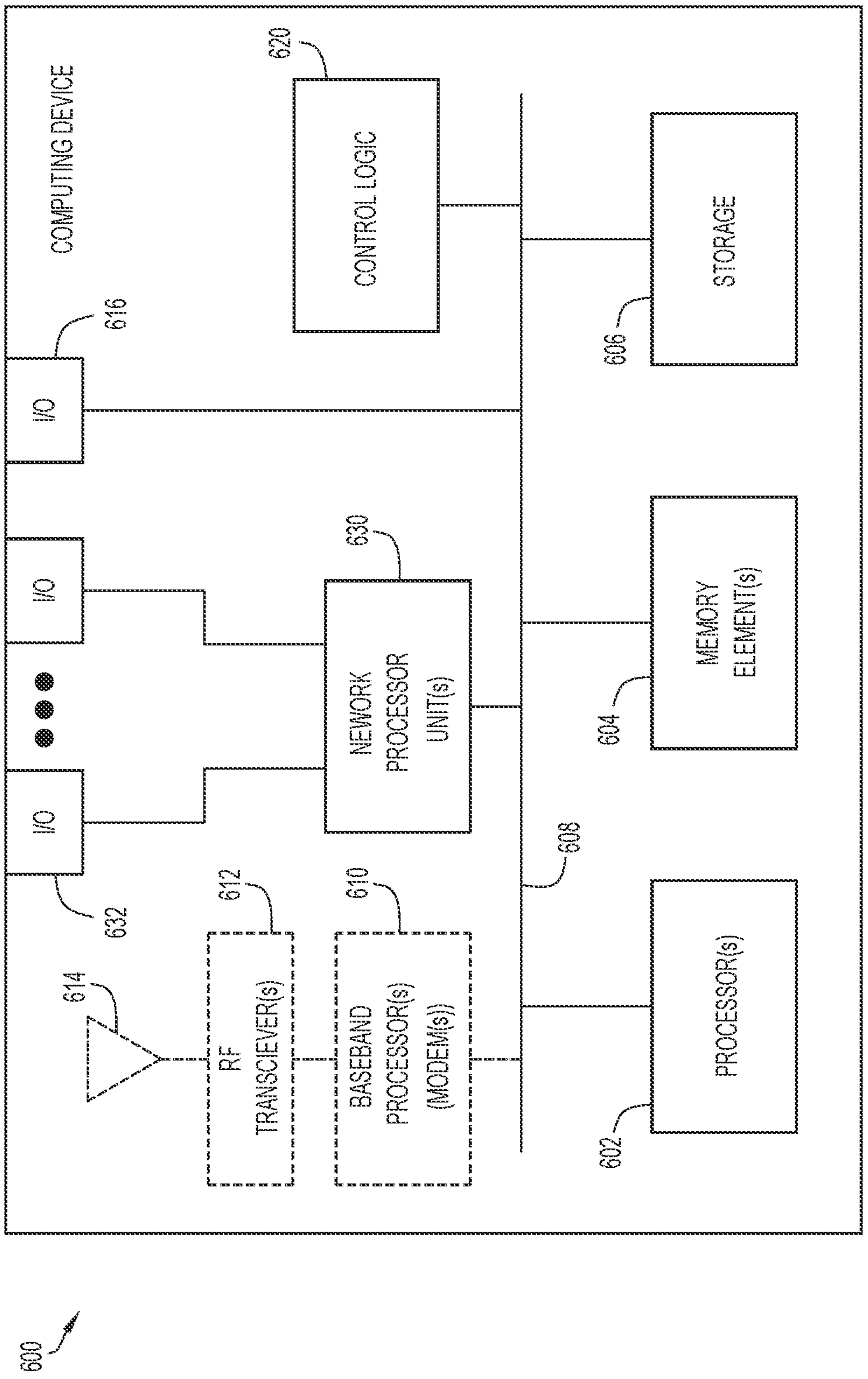
FIG. 6 illustrates a hardware block diagram of a computing device configured to perform functions associated with operations discussed in connection with embodiments herein.

Referring to FIG. 6, FIG. 6 illustrates a hardware block diagram of a computing device 600 that may perform functions associated with operations discussed herein in connection with the techniques described for embodiments herein. In various embodiments, a computing device or apparatus, such as computing device 600 or any combination of computing devices 600, may be configured as any entity/entities in order to perform operations of the various techniques discussed for embodiments herein, such as any elements, functions, etc. discussed for embodiments herein (e.g., credential generation system 102, penetration testing system 104, etc.).

In at least one embodiment, the computing device 600 may be any apparatus that may include one or more processor(s) 602, one or more memory element(s) 604, storage 606, a bus 608, one or more network processor unit(s) 630 interconnected with one or more network input/output (I/O) interface(s) 632, one or more I/O interface(s) 616, and control logic 620. In various embodiments, instructions associated with logic for computing device 600 can overlap in any manner and are not limited to the specific allocation of instructions and/or operations described herein.

For embodiments in which computing device 600 may be implemented as any device capable of wireless communications, computing device 600 may further include at least one baseband processor or modem 610, one or more radio RF transceiver(s) 612 (e.g., any combination of RF receiver (s) and RF transmitter(s)), one or more antenna(s) or antenna array(s) 614.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element (s) 604 and/or storage 606. For example, any logic described herein (e.g., control logic 620, which can include any combination of data gathering logic 110 and ML logic 120/ML model 122 for credential generation system 102, or penetration logic 106 and analysis logic 108 for penetration testing system 104) can, in various embodiments, be stored for computing device 600 using any combination of memory element(s) 604 and/or storage 606. Note that in some embodiments, storage 606 can be consolidated with memory element(s) 604 (or vice versa) or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 630 may enable communication between computing device 600 and other systems, entities, etc., via network I/O interface(s) 632 (wired and/or wireless) to facilitate operations discussed for various embodiments described herein. In various embodiments, network processor unit(s) 630 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 632 can be configured as one or more Ethernet port(s), Fibre Channel ports, any other I/O port(s), and/or antenna(s)/antenna array(s) now known or hereafter developed. Thus, the network processor unit(s) 630 and/or network I/O interface(s) 632 may include suitable interfaces for receiving, transmitting, and/or otherwise communicating data and/or information (wired and/or wirelessly) in a network environment.

I/O interface(s) 616 allow for input and output of data and/or information with other entities that may be connected to computing device 600. For example, I/O interface(s) 616 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 600 is implemented as a wireless device or any apparatus capable of wireless communications, the RF transceiver(s) 612 may perform RF transmission and RF reception of wireless signals via antenna(s)/antenna array(s) 614, and the baseband processor or modem 610 performs baseband modulation and demodulation, etc. associated with such signals to enable wireless communications for computing device 600.

In various embodiments, control logic 620, which can include any combination of data gathering logic 110 and ML logic 120/ML model 122 for credential generation system 102, or penetration logic 106 and analysis logic 108 for penetration testing system 104, can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); ML model 122 training, enterprise data classification; category data generation; testing credential generation; penetration testing and/or analysis operations; combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element (s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include gathering public credentials from a plurality of credential databases; generating, using machine learning logic, one or more sets of the public credentials for each of one or more credential categories; gathering enterprise data for an enterprise, the enterprise data including user data of enterprise users of enterprise assets; categorizing, using the machine learning logic, the enterprise data into at least one credential category of the one or more credential categories, wherein the at least one credential category is associated with credential generation rules; and generating, using the machine learning logic, a plurality of testing credentials based on the enterprise data and the credential generation rules of the at least one credential category.

In one instance, the method may further include performing penetration testing of the enterprise assets using the plurality of testing credentials. In one instance, the method may further include updating the machine learning logic based on results of the penetration testing. In one instance, categorizing, using the machine learning logic, the enterprise data into at least one credential category of the one or more credential categories includes: determining characteristics of the enterprise data or identifying terms included in the enterprise data; and matching the characteristics or terms of the enterprise data to at least one credential characteristic or term associated with the at least one credential category.

In one instance, the testing credentials include a credential spray comprising a plurality of passwords. In one instance, the credential spray further comprises a plurality of usernames. The one or more credential categories may include at least one of: a user name category; a date of birth category; a hobbies category; and an industry specific term category. In one instance, gathering the enterprise data includes: gathering the enterprise data from public data sources including social media sources; and gathering the enterprise data from private data sources of an enterprise network.

In one instance, generating, using the machine learning logic, the one or more sets of the public credentials for each of the one or more credential categories includes: training the machine learning logic to identify at least one credential characteristic of the public credentials in order to generate the one or more sets of the public credentials for each of the one or more credential categories.

In one instance, the method may further include gathering new enterprise data for the enterprise users; and performing the categorizing, the generating, and performing based on the new user data.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

gathering public credentials from a plurality of credential databases;

generating, using machine learning logic, a plurality of sets of the public credentials for each of a plurality of credential categories, wherein the plurality of credential categories include at least a user name category and a date of birth category;

gathering enterprise data for an enterprise, the enterprise data including user data of enterprise users of enterprise assets;

categorizing, using the machine learning logic, the enterprise data into each of a credential category of the plurality of credential categories;

generating, using the machine learning logic, a plurality of customized penetration testing credentials in which the plurality of customized penetration testing credentials are generated using the enterprise data that includes the user data of the enterprise users of the enterprise assets and using credential generation rules that indicate formatting and permutations for each credential category; and performing penetration testing of the enterprise assets using the plurality of customized penetration testing credentials.

2. The method of claim 1, further comprising:

updating the machine learning logic based on results of the penetration testing.

3. The method of claim 1, wherein categorizing, using the machine learning logic, the enterprise data into each credential category of the plurality of credential categories includes:

determining characteristics of the enterprise data or identifying terms included in the enterprise data; and matching the characteristics or terms of the enterprise data to at least one credential characteristic or term associated with each credential category.

4. The method of claim 1, wherein the plurality of customized penetration testing credentials includes a credential spray comprising a plurality of customized penetration testing passwords that are generated for the enterprise users of the enterprise assets to perform the penetration testing of the enterprise assets.

5. The method of claim 4, wherein the credential spray further comprises a plurality of customized penetration testing usernames that are generated for the enterprise users of the enterprise assets to perform the penetration testing of the enterprise assets.

6. The method of claim 1, wherein the plurality of credential categories further includes:

a hobbies category; and an industry specific term category.

7. The method of claim 1, wherein gathering the enterprise data includes:

gathering the enterprise data from public data sources including social media sources; and gathering the enterprise data from private data sources of an enterprise network.

8. The method of claim 1, wherein generating, using the machine learning logic, the plurality of sets of the public credentials for each of the plurality of credential categories includes:

training the machine learning logic to identify at least one credential characteristic of the public credentials in order to generate the plurality of sets of the public credentials for each of the plurality of credential categories.

9. The method of claim 1, further comprising:

gathering new enterprise data for the enterprise users; and performing the categorizing and the generating for generating a plurality of new customized penetration testing credentials based on the new enterprise data.

10. The method of claim 1, wherein the credential generation rules include credential generation rules for multi-category data that includes permutation and formatting characteristics for using the enterprise data that includes the user data of the enterprise users of the enterprise assets for multiple credential categories for generating the customized penetration testing credentials.

11. The method of claim 10, wherein the multiple credential categories that are used for generating the penetration testing credentials include the user name category, the date of birth category, and an industry specific terms category.

12. One or more non-transitory computer readable storage media encoded with instructions that, when executed by a processor, cause the processor to perform operations, comprising:

gathering public credentials from a plurality of credential databases;

generating, using machine learning logic, a plurality of sets of the public credentials for each of a plurality of credential categories, wherein the plurality of credential categories include at least a user name category and a date of birth category;

gathering enterprise data for an enterprise, the enterprise data including user data of enterprise users of enterprise assets;

categorizing, using the machine learning logic, the enterprise data into each of a credential category of the plurality of credential categories;

generating, using the machine learning logic, a plurality of customized penetration testing credentials in which the plurality of customized penetration testing credentials are generated using the enterprise data that includes the user data of the enterprise users of the enterprise assets and using credential generation rules that indicate formatting and permutations for each credential category; and performing penetration testing of the enterprise assets using the plurality of customized penetration testing credentials.

13. The media of claim 12, wherein categorizing, using the machine learning logic, the enterprise data into each credential category of the plurality of credential categories includes:

determining characteristics of the enterprise data or identifying terms included in the enterprise data; and matching the characteristics or terms of the enterprise data to at least one credential characteristic or term associated with each credential category.

14. The media of claim 12, wherein the plurality of customized penetration testing credentials includes a credential spray comprising a plurality of customized penetration testing passwords that are generated for the enterprise users of the enterprise assets to perform the penetration testing of the enterprise assets.

15. A system comprising:

at least one memory element for storing data; and at least one processor for executing instructions associated with the data, wherein executing the instructions causes the system to perform operations, comprising:

gathering public credentials from a plurality of credential databases;

generating, using machine learning logic, a plurality of sets of the public credentials for each of a plurality of credential categories, wherein the plurality of credential categories include at least a user name category and a date of birth category;

gathering enterprise data for an enterprise, the enterprise data including user data of enterprise users of enterprise assets;

categorizing, using the machine learning logic, the enterprise data into each of a credential category of the plurality of credential categories;

generating, using the machine learning logic, a plurality of customized penetration testing credentials in which the plurality of customized penetration testing credentials are generated using the enterprise data that includes the user data of the enterprise users of the enterprise assets and using credential generation rules that indicate formatting and permutations for each credential category; and performing penetration testing of the enterprise assets using the plurality of customized penetration testing credentials.

16. The system of claim 15, wherein categorizing, using the machine learning logic, the enterprise data into each credential category of the plurality of credential categories includes:

determining characteristics of the enterprise data or identifying terms included in the enterprise data; and matching the characteristics or terms of the enterprise data to at least one credential characteristic or term associated with each credential category.

17. The system of claim 15, wherein the plurality of customized penetration testing credentials includes a credential spray comprising a plurality of customized penetration testing usernames and customized penetration testing passwords that are generated for the enterprise users of the enterprise assets to perform the penetration testing of the enterprise assets.

18. The system of claim 15, wherein generating, using the machine learning logic, the plurality of sets of the public credentials for each of the plurality of credential categories includes:

training the machine learning logic to identify at least one credential characteristic of the public credentials in order to generate the plurality of sets of the public credentials for each of the plurality of credential categories.

19. The system of claim 15, wherein gathering the enterprise data includes:

gathering the enterprise data from public data sources including social media sources; and gathering the enterprise data from private data sources of an enterprise network.

20. The system of claim 15, wherein the plurality of testing credentials includes a credential spray comprising a plurality of usernames and passwords for the enterprise users of the enterprise assets.

* * * * *